United States Patent
Kunz

(10) Patent No.: US 12,367,130 B2
(45) Date of Patent: Jul. 22, 2025

(54) TEST FRAMEWORK VIA LANGUAGE SERVER PROTOCOL

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 110 days.

(21) Appl. No.: 18/138,936

(22) Filed: Apr. 25, 2023

(65) Prior Publication Data

US 2024/0362151 A1 Oct. 31, 2024

(51) Int. Cl.
  *G06F 11/3698* (2025.01)
  *G06F 11/3668* (2025.01)

(52) U.S. Cl.
  CPC ...... *G06F 11/3698* (2025.01); *G06F 11/3688* (2013.01)

(58) Field of Classification Search
  CPC .......... G06F 11/3664; G06F 11/3688
  USPC .................. 717/120–140
  See application file for complete search history.

(56) References Cited

U.S. PATENT DOCUMENTS

| | | | | |
|---|---|---|---|---|
| 6,637,024 B1* | 10/2003 | Johnson | ........... | G06F 11/3636 717/124 |
| 6,907,546 B1* | 6/2005 | Haswell | ........... | G06F 11/3684 717/124 |
| 7,826,381 B1* | 11/2010 | Kastuar | ........... | H04L 12/4641 370/242 |
| 7,831,955 B2* | 11/2010 | Tamura | ........... | G06F 9/545 717/100 |
| 8,370,799 B2* | 2/2013 | Nir-Buchbinder | ........ | G06F 8/33 717/113 |
| 9,170,782 B2* | 10/2015 | Carter | ........... | G06F 8/33 |
| 9,210,050 B2* | 12/2015 | Bugenhagen | ........ | H04L 41/5022 |
| 9,483,259 B1* | 11/2016 | Lee | ........... | G06F 8/70 |
| 9,703,554 B2* | 7/2017 | Eberlein | ........... | G06F 8/73 |
| 10,983,813 B2* | 4/2021 | Gulwani | ........... | G06F 8/30 |
| 11,074,156 B1* | 7/2021 | Lindblad | ........... | G06F 11/3644 |
| 11,803,786 B2* | 10/2023 | Rozenfeld | ........ | H04L 67/02 |
| 2020/0050431 A1* | 2/2020 | Zilouchian Moghaddam | ........... | G06F 8/38 |

OTHER PUBLICATIONS

Rodriguez-Echeverria et al., "Towards a Language Server Protocol Infrastructure for Graphical Modeling", ACM, pp. 1-11 (Year: 2018).*

Barros et al., "Editing Support for Software Languages: Implementation Practices in Language Server Protocols", ACM, 1-12 (Year: 2022).*

(Continued)

*Primary Examiner* — Anil Khatri
(74) *Attorney, Agent, or Firm* — SCHWEGMAN LUNDBERG & WOESSNER, P.A.

(57) ABSTRACT

In an example embodiment, a Language Server Protocol (LSP) is utilized to connect IDEs to test frameworks via a shared language server. More particularly, the shared language server is modified to permit feedback to be delivered regarding test results from the test framework to be delivered to the IDEs, either directly via a code action that supports direct feedback, or indirectly by causing the language server to write test results to the IDEs as code comments within the software code itself. The result is that a single test framework can be utilized by developers using completely different IDEs, without requiring a separate test framework to be developed for each IDE.

20 Claims, 7 Drawing Sheets

(56) References Cited

OTHER PUBLICATIONS

Jeanjean et al, "IDE as Code: Reifying Language Protocols as First-Class Citizens", ACM, pp. 1-5 (Year: 2021).*
Loth et al., "UVLS: A Language Server Protocol for UVL", ACM, pp. 1-4 (Year: 2023).*
Salihbegovic et al., "Design of a domain specific language and IDE for Internet of things applications", IEEE, pp. 1-6 (Year: 2015).*
"European Application Serial No. 23186362.2, Extended European Search Report mailed Jul. 25, 2024", 8 pgs.
Meszaros, Monika, "Delivering comprehension features into source code editors through LSP", 42nd International Convention on Information and Communication Technology, Electronics and Microelectronics (MIPRO), Croatian Society MIPRO, (2019), 1581-1586.
Rask, Jonas, "The Specification Language Server Protocol: A Proposal for Standardised LSP Extensions", arxiv.org, Cornell University Library, 201 Olin Library Cornell University Ithaca, NY 14853, (Aug. 6, 2021), 16 pgs.

* cited by examiner

TEST FRAMEWORK VIA LANGUAGE SERVER PROTOCOL

TECHNICAL FIELD

This document generally relates to computer software application development. More specifically, this document relates to running a test framework using a language server protocol.

BACKGROUND

Computer software may be written using an integrated development environment (IDE), which is a software application that provides developers with a comprehensive set of tools for writing, testing, and debugging code. An IDE typically includes a code editor, a compiler or interpreter, a debugger, and other tools that help developers automate common tasks and streamline their workflow.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
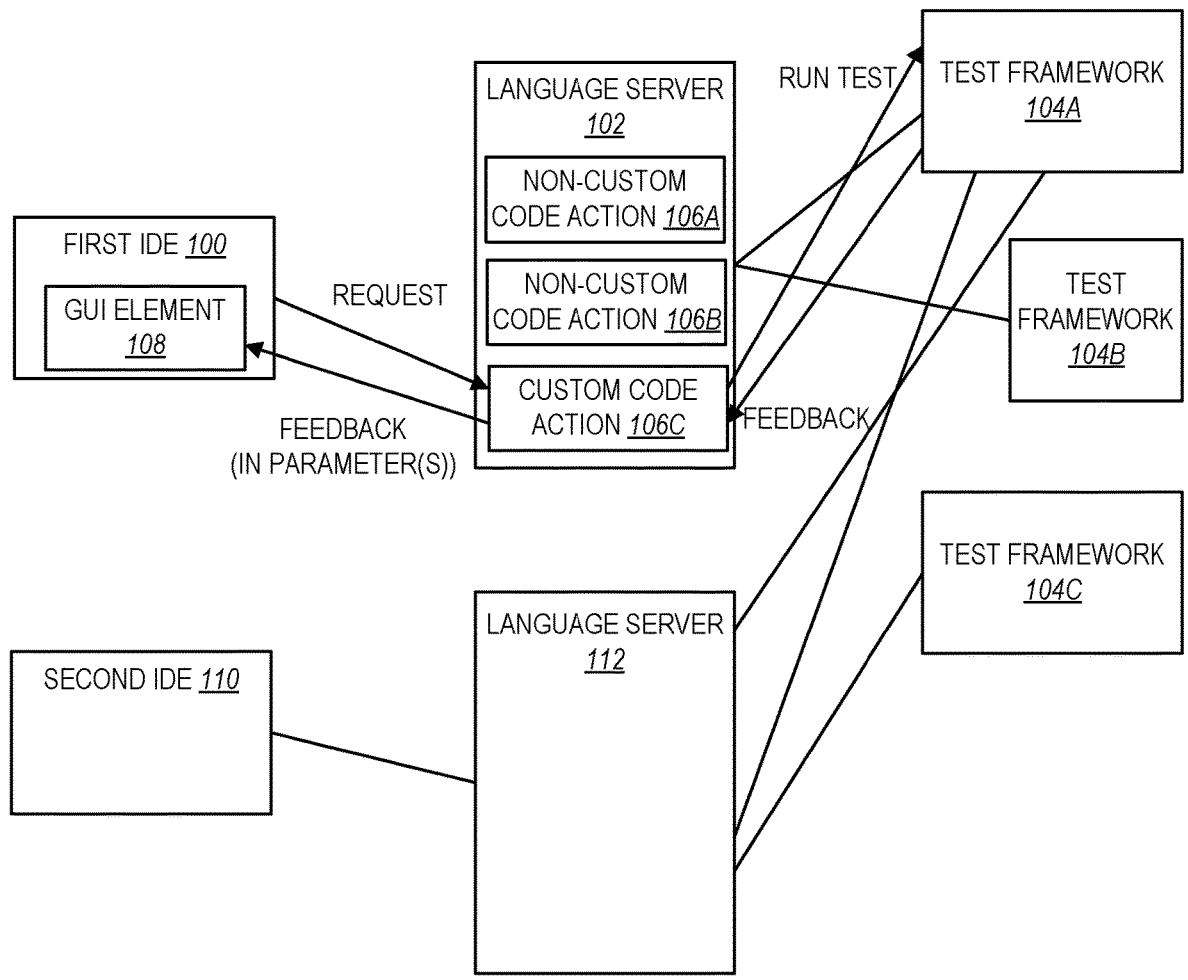
FIG. 1 is a block diagram illustrating a system for implementing a test framework via a language service protocol (LSP), in accordance with a first example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a solution is provided to a technical issue that is encountered in IDEs.

An IDE comprises a series of components for software developers to use when developing computer software. These components may include, for example:

Code Editor: An IDE provides a text editor with features such as syntax highlighting, code completion, and code formatting to help developers write code quickly and efficiently.

Compiler or Interpreter: IDEs typically come with a compiler or interpreter for the programming language being used, which can help catch errors and improve code quality.

Debugger: IDEs provide a debugger that allows developers to step through their code line-by-line, set breakpoints, and inspect variables and memory during runtime.

Build and Deployment Tools: IDEs often come with tools that automate the build and deployment process, allowing developers to easily package and distribute their applications.

Integration with Version Control: IDEs usually integrate with version control systems like Git, allowing developers to manage changes to their codebase more easily.

Software developers also create test frameworks to test their code. A test framework is a collection of guidelines, coding standards, and libraries that provide a structured approach to testing software. It is a tool that helps developers and quality assurance professionals to automate the process of writing, executing, and reporting tests. A test framework typically includes the following components:

(1) Test runner: A tool that executes test cases and reports the results.

(2) Test data: The input data required for executing test cases.

(3) Test fixtures: The setup and teardown code that is executed before and after each test case.

(4) Assertions: The code that checks the expected results against the actual results.

Typically, an integration to invoke the functionality of the test framework must be created for each ID independently. In other words, an integration designed for use with a first IDE will not work with a second IDE. For example, the VSCode JavaScript Jest runner/debugger differs completely from Neovim's JavaScript Jest runner/debugger. This causes implementation to be time-consuming and hence reduces the total number of supported editor/test framework combinations.

In an example embodiment, a Language Server Protocol (LSP) is utilized to connect IDEs to test frameworks via a shared language server. More particularly, the shared language server is modified to permit feedback to be delivered regarding test results from the test framework to be delivered to the IDEs, either directly via a code action that supports direct feedback, or indirectly by causing the language server to write test results to the IDEs as code comments within the software code itself. The result is that a single test framework can be utilized by developers using completely different IDEs, without requiring a separate test framework to be developed for each IDE.

An LSP is a communication protocol that facilitates the integration of language-specific tools such as editors, integrated development environments (IDEs), and other code-related tools. One such LSP is the Language Server Protocol (LSP) developed by Microsoft™, Inc. of Redmond, Washington. The LSP developed by Microsoft™, Inc. is a specific open-source protocol, but for purposes of this disclosure, the term LSP is intended to be interpreted broadly to refer to any language server protocol, and not be limited to just the LSP developed by Microsoft™, Inc.

The LSP enables editors and other tools to interact with language-specific tools through a standardized interface, which helps to improve the consistency and quality of language support across different tools.

The LSP provides a common protocol for communication between a language server and a client, such as an editor or IDE. The language server provides the client with information about the code, such as syntax highlighting, code completion, and error checking, while the client provides the language server with information about the code being edited, such as changes in the code, cursor position, and the current selection.

Using an LSP, an IDE can call a code action within a language server, to cause the language server to make a call that performs some function. For example, a code action may modify code (e.g., renaming a function, changing a structure, etc.) or navigate to a particular portion (e.g., definition, implementation) of the code.

As mentioned earlier, in an example embodiment, the LSP is modified to allow connections between IDEs and test frameworks. There are several different implementation embodiments that may be used to accomplish this. In a first example embodiment, a custom code action for a language server utilizing the LSP is created. This custom code action can be called in the same manner as non-custom code actions, but the custom code action is specifically designed to obtain feedback (e.g., test passed, test failed, particular test score(s), etc.) from a test framework referenced in the call, and to communicate the feedback to the calling IDE via one or more custom parameter. The one or more custom parameter may then be used by the calling IDE to render some sort of specialized display indicating the feedback to the user (e.g., pop-up window, sidebar, etc.).

In a second example embodiment, a non-custom code action already established in the language server is used to obtain the feedback. The same type of feedback may be obtained from the referenced test framework as in the first example embodiment, but rather than define one or more custom parameter to return the feedback, the feedback is directly written into the code inside the IDE as commented code. Commented code is code that has some sort of special symbols indicating that the commented code is not to be compiled or interpreted. It is commonly used for programmers to enter comments/descriptions about what functions corresponding sections of non-commented code are performing. In this case, however, the commented code is used to report the feedback from the test framework.

In either the first or second example embodiments, the communication between the language server and the test framework(s) is performed via an LSP.

FIG. 1 is a block diagram illustrating a system for implementing a test framework via a LSP, in accordance with a first example embodiment. Here, a first IDE 100 communicates with a first language server 102 via an LSP. This communication may include a request to run one or more tests from a test framework, such as test framework 104A or test framework 104B. Notably, the option exists for the first IDE 100 to run tests from any of the test frameworks 104A, 104B connected to the first language server 102. This is because the first language server 102 is connected to the test frameworks 104A, 104B via the LSP.

More particularly, in this first example embodiment, despite the presence of one or more non-custom code actions 106A, 106B within the first language server 102, the first IDE 100 calls a custom code action 106C. The custom code action acts to interpret the call, and specifically identify which test framework 104A, 104B and which tests within that test framework 104A, 104B to call based on the contents of the call from the first IDE 100. For example, the call from the first IDE 100 may specify that test #1 in test framework 104A should be run (or at least provide the location of the cursor, which allows the LSP server to identify the nearest test). In this case, the custom code action 106C calls test #1 in test framework 104A and receives feedback from the test framework 104A indicating the results of the running of test #1. This feedback may then be included in one or more custom parameters passed back to the first IDE 100 from the first language server 102, and then the first IDE 100 can render or otherwise display the feedback (or a summary thereof) via some sort of specialized graphical user interface element (GUI) 108.

Similar functionality can be accomplished for a second IDE 110, which may communicate with a separate second language server 112, which itself may be in communication with one or more test frameworks, including test frameworks 104A, 104B as well as one or more test framework 104C not in communication with the first language server 102.

Figure 2:
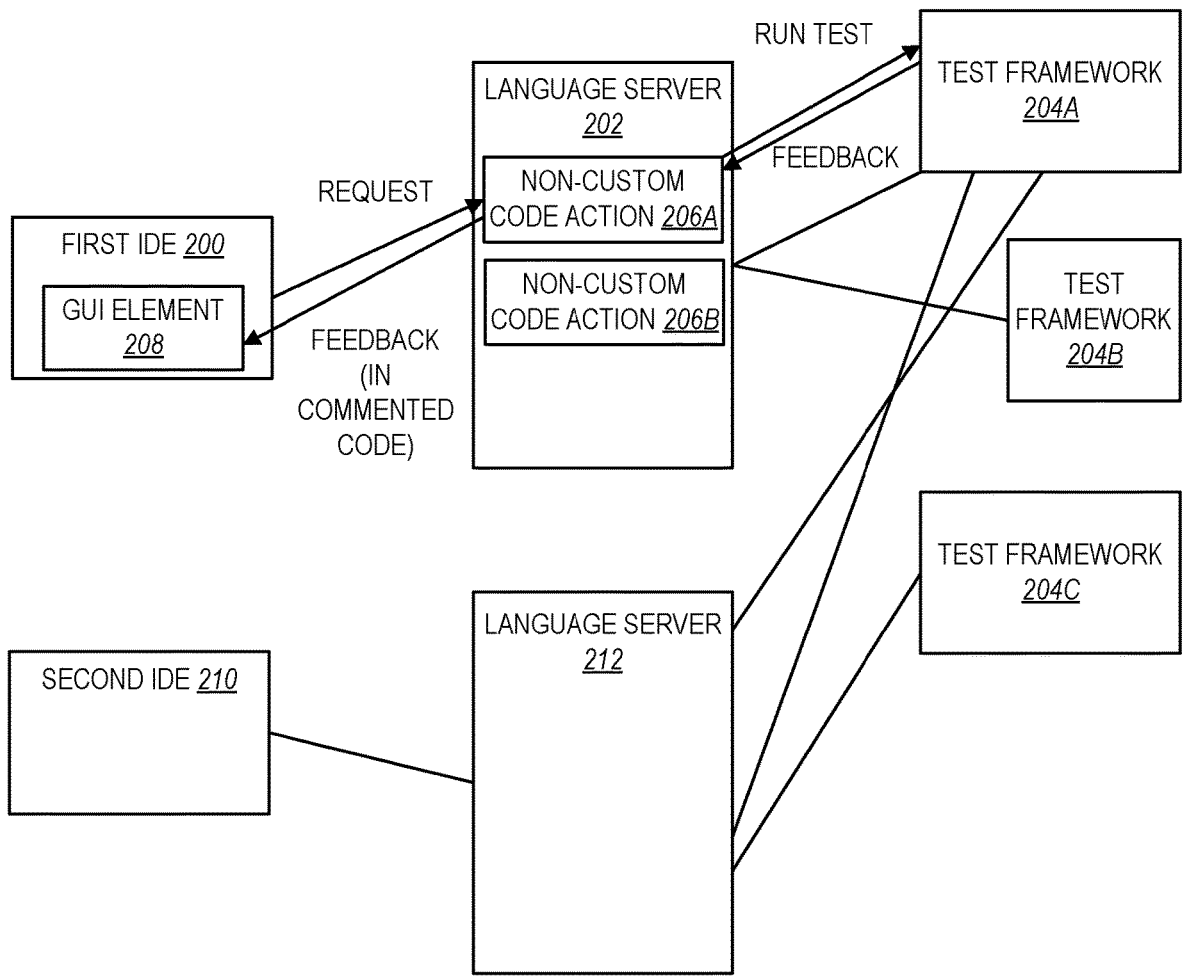
FIG. 2 is a block diagram illustrating a system for implementing a test framework via an LSP, in accordance with a second example embodiment.

FIG. 2 is a block diagram illustrating a system for implementing a test framework via an LSP, in accordance with a second example embodiment. Here, a first IDE 200 communicates with a first language server 202 via an LSP. This communication may include a request to run one or more tests from a test framework, such as test framework 204A or test framework 204B. Notably, the option exists for the first IDE 200 to run tests from any of the test frameworks 204A, 204B connected to the first language server 202. This is because the first language server 202 is connected to the test frameworks 204A, 204B via the LSP.

More particularly, in this second example embodiment, the non-custom code action 206A is called by the first IDE 200. The non-custom code action 206A acts to interpret the call, and specifically identify which test framework 204A, 204B and which tests within that test framework 204A, 204B to call based on the contents of the call from the first IDE 200. For example, the call from the first IDE 200 may specify that test #1 in test framework 204A should be run. In this case, the non-custom code action 206A calls test #1 in test framework 204A and receives feedback from the test framework 204A, indicating the results of the running of test #1. Since non-custom code action 206A is non-custom, it does not offer the feature of custom parameters. As such, non-custom code action 206A writes the feedback (or a summary thereof) as commented code within the corresponding code in the first IDE 200. The user can then view the feedback in this commented code.

Similar functionality can be accomplished for a second IDE 210, which may communicate with a separate second language server 212, which itself may be in communication with one or more test frameworks, including test frameworks 204A, 204B as well as one or more test framework 204C not in communication with the first language server 202.

Notably, in the above two embodiments, each IDE has a different corresponding language server. In some example embodiments, multiple IDEs can share a single language server. This may be accomplished in one of two ways. One way is to have the single language server have a different set of code actions corresponding to each connected IDE. Thus, a first IDE will only call a code action associated with the first IDE and will not call a code action associated with a second IDE, despite both code actions existing on the same language server. Another way is to have a language detection component within the single language server that detects a language of a file passed to it in the call from an IDE, parse the file into an abstract syntax tree (AST) that can be used by a code action regardless of the original language of the file. This parsing may be performed via, for example, a parser generator tool such as Tree-sitter.

Figure 3:
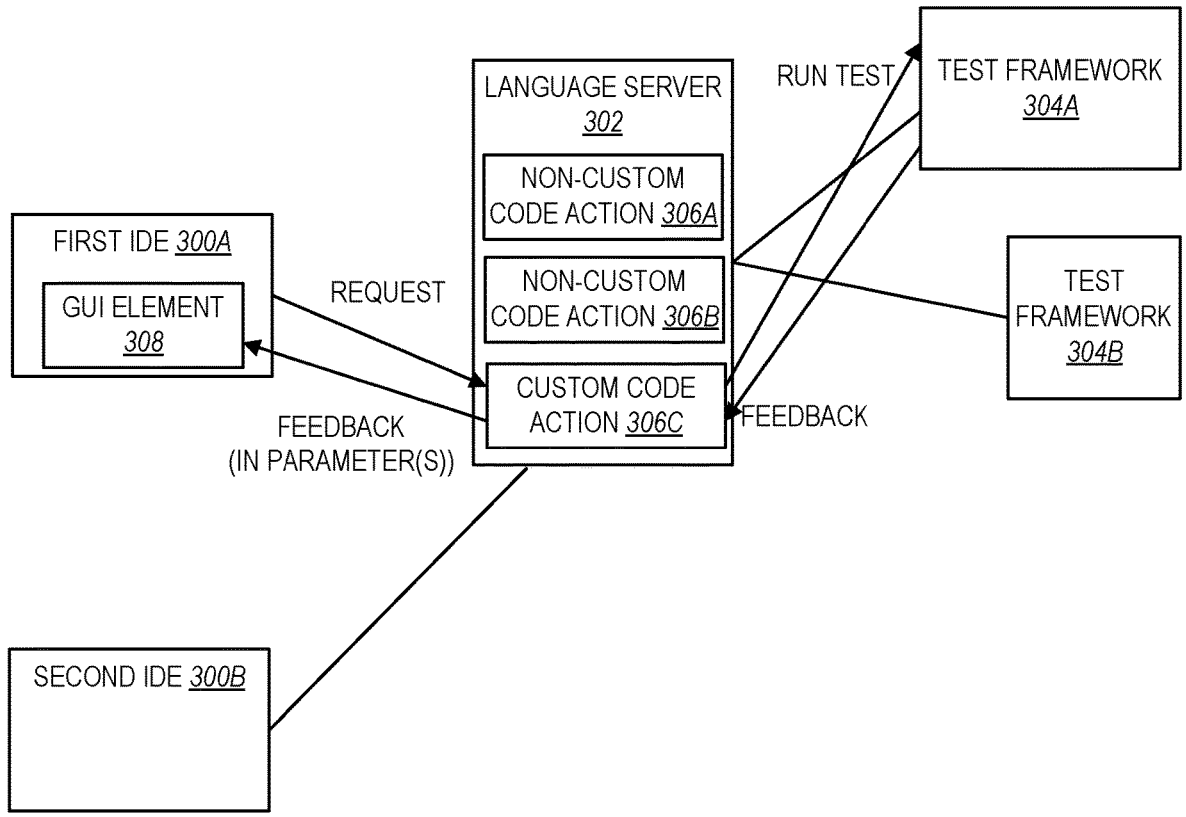
FIG. 3 is a block diagram illustrating a system for implementing a test framework via a LSP, in accordance with a third example embodiment.

FIG. 3 is a block diagram illustrating a system for implementing a test framework via an LSP, in accordance with a third example embodiment. The third example embodiment is similar to the first example embodiment, except that multiple IDEs 300A, 300B share a single language server 302. One of the IDEs 300A, 300B then attempts to communicate with the language server 302 via the LSP. This communication may include a request to run one or more tests from a test framework, such as test framework 304A or test framework 304B. Notably, the option exists for the either of IDE 300A, 300B to run tests from any of the test frameworks 304A, 304B connected to the language server 302. This is because the language server 302 is connected to the test frameworks 304A, 304B via the LSP.

More particularly, in this third example embodiment, despite the presence of one or more non-custom code actions 306A, 306B within the language server 302, the IDE 300A, 300B calls a custom code action 306C. The custom code action acts to interpret the call, and specifically identify which test framework 304A, 304B and which tests within that test framework 304A, 304B to call based on the contents of the call from the IDE 300A, 300B. For example, the call from the IDE 300A, 300B may specify that test #1 in test framework 304A should be run. In this case, the custom code action 306C calls test #1 in test framework 304A and receives feedback from the test framework 304A indicating the results of the running of test #1. This feedback may then be included in one or more custom parameters passed back to the IDE 300 from the first language server 302, and then the IDE 300A can render or otherwise display the feedback (or a summary thereof) via some sort of specialized graphical user interface element 308.

Figure 4:
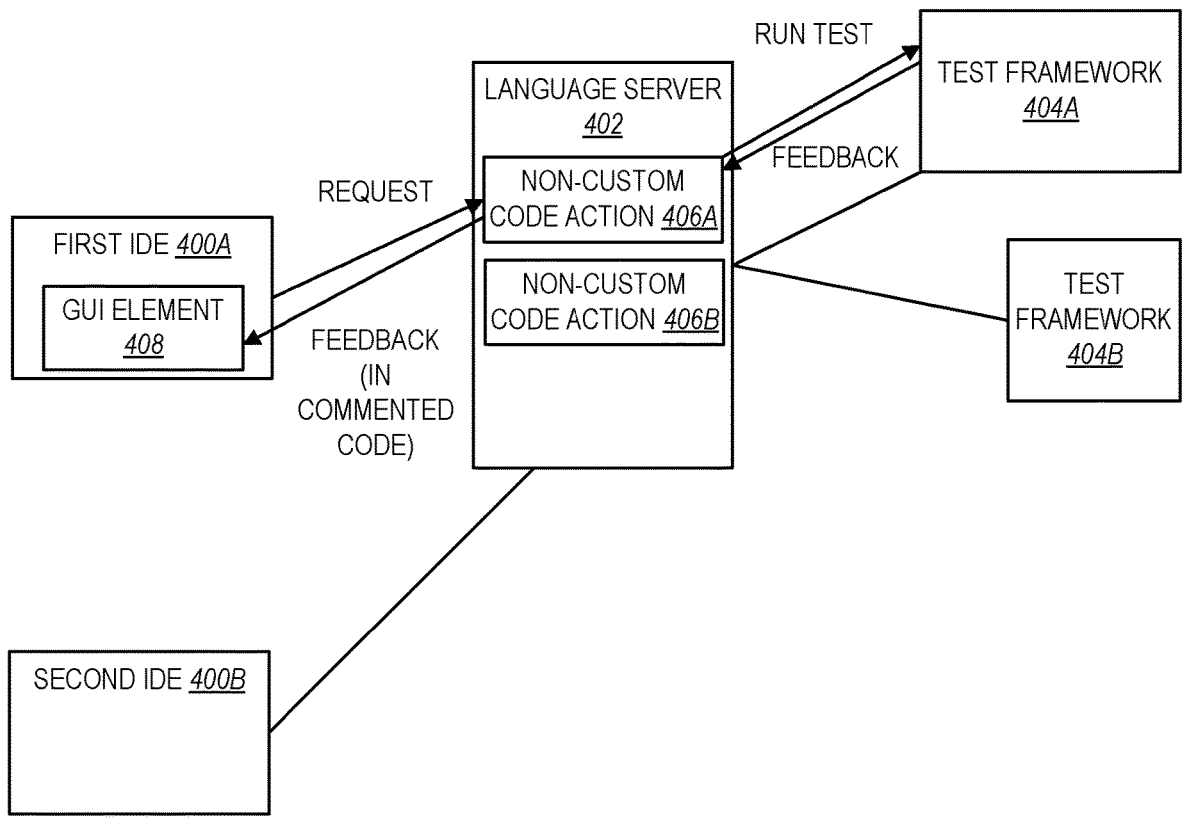
FIG. 4 is a block diagram illustrating a system for implementing a test framework via a LSP, in accordance with a fourth example embodiment.

FIG. 4 is a block diagram illustrating a system for implementing a test framework via an LSP, in accordance with a fourth example embodiment. Here, one or more IDE 400A, 400B communicates with a language server 402 via an LSP. This communication may include a request to run one or more tests from a test framework, such as test framework 404A or test framework 404B. Notably, the option exists for either IDE 400A, 400B to run tests from any of the test frameworks 404A, 404B connected to the language server 402. This is because the language server 402 is connected to the test frameworks 404A, 404B via the LSP.

More particularly, in this second example embodiment, the non-custom code action 406A is called by the IDE 400A, 400B. The non-custom code action 406A acts to interpret the call, and specifically identify which test framework 404A, 404B and which tests within that test framework 404A, 404B to call based on the contents of the call from the calling IDE 400A, 400B. For example, the call from the IDE 400A, 400B may specify that test #1 in test framework 404A should be run. In this case, the non-custom code action 406A calls test #1 in test framework 404A and receives feedback from the test framework 404A indicating the results of the running of test #1. Since non-custom code action 406A is non-custom, it does not offer the feature of custom parameters. As such, non-custom code action 406A writes the feedback (or a summary thereof) as commented code within the corresponding code in the corresponding IDE 400A, 400B. The user can then view the feedback in this commented code.

In a further example embodiment, an optional debugging feature may be offered. Here, a user can select to run a test in a debugging mode. Running in debugging mode allows the user to see additional information about the running of code sections, such as values of variables in the code as the test(s) is/are being run. In order to accomplish this within the context of a language server is technically challenging, however, as currently there is no mechanism to have a debugging feature in a language agnostic way. Therefore, in this further example embodiment, a debug adapter protocol (DAP). A DAP is a protocol for communication between a debugger and an integrated development environment (IDE) or a code editor. It provides a common language for debugging tools to exchange information about breakpoints, stepping, variable inspection, and other debugging actions.

Figure 5:
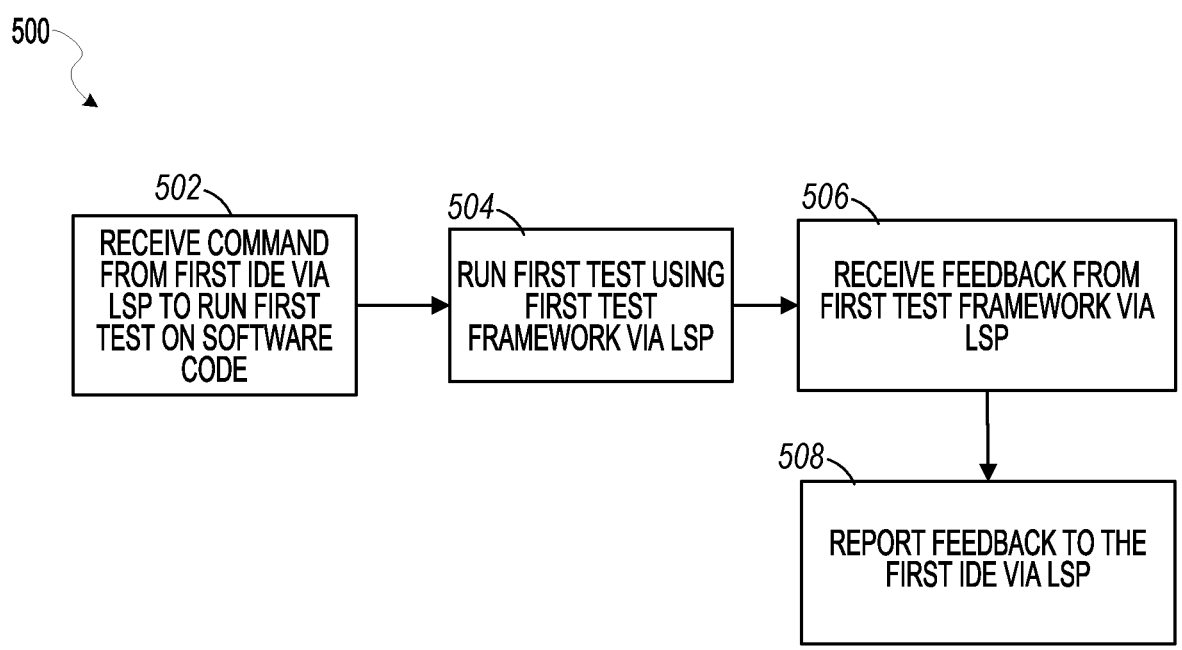
FIG. 5 is a flow diagram illustrating a method 500 for running a language server, in accordance with an example embodiment.

When the user wishes to run the test in debug mode, they will cause the corresponding IDE to send a message to the language server, which then starts the test in debug mode, which involves attaching a debugger using the DAP. FIG. 5 is a flow diagram illustrating a method 500 for running a language server, in accordance with an example embodiment. At operation 502, the language server receives, via a language server protocol (LSP), a command from a first integrated development environment (IDE) to run a first test, on software code in the first IDE, from a first test framework. In some example embodiments this may include a command to run the first test in a debug mode.

At operation 504, the language server runs the first test from the first test framework by communicating with the first test framework using the LSP. The running of the first test involves execution of a code action on the language server. This may either be a non-custom code action or a custom code action. The difference will be found later when feedback from the first test is reported to the first IDE.

In the situation where the command included a command to run the first test in a debug mode, the language server may attach a debugger to the first test using a DAP.

At operation 506, feedback is received from the first test framework via the LSP, the feedback including one or more results from execution of the first test on the software code. At operation 508, the feedback is reported to the first IDE via the LSP. In the case of a non-custom code action, this reporting may include writing information regarding the feedback to the code itself as commented code. In the case of a custom code action, this reporting may include passing the information regarding the feedback to the first IDE via one or more custom parameters.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising: receiving, at a language server, via a language server protocol (LSP), a command from a first integrated development environment (IDE) to run a first test, on software code in the first IDE, from a first test framework;
running the first test from the first test framework by communicating with the first test framework using the LSP;
receiving feedback from the first test framework via the LSP, the feedback including one or more results from execution of the first test on the software code; and
reporting information regarding the feedback to the first IDE via the LSP.

Example 2. The system of Example 1, wherein the command is a command to execute a code action of the language server.

Example 3. The system of Example 2, wherein the reporting information regarding the feedback includes writing information representing the feedback into the software code as commented code.

Example 4. The system of Example 2, wherein the code action is a custom code action defining one or more custom parameters, the one or more custom parameters used to pass the information representing the feedback to the first IDE.

Example 5. The system of Example 4, wherein the information in the one or more custom parameters is rendered in a graphical user interface element at the first IDE.

Example 6. The system of any of Examples 1-5, wherein the operations further comprise:
  receiving, at the language server, via the LSP, a command from a second IDE to run the first test, on software code in the second IDE, from the first test framework;
  running the first test on the software code by the second IDE, from the first test framework by communicating with the first test framework using the LSP;
  receiving feedback regarding the running of the first test on the software code by the second IDE from the first test framework via the LSP;
  reporting information regarding the feedback regarding the running of the first test on the software code by the second IDE to the second IDE via the LSP.

Example 7. The system of any of Examples 1-6, wherein the command includes a request to run the first test in a debug mode, and wherein the running the first test from the first test framework by communicating with the first test framework using the LSP includes attaching a debugger to the first test using a debug adapter protocol (DAP).

Example 8. A method comprising:
  receiving, at a language server, via a language server protocol (LSP), a command from a first integrated development environment (IDE) to run a first test, on software code in the first IDE, from a first test framework;
  running the first test from the first test framework by communicating with the first test framework using the LSP;
  receiving feedback from the first test framework via the LSP, the feedback including one or more results from execution of the first test on the software code; and
  reporting information regarding the feedback to the first IDE via the LSP.

Example 9. The method of Example 8, wherein the command is a command to execute a code action of the language server.

Example 10. The method of Example 9, wherein the reporting information regarding the feedback includes writing information representing the feedback into the software code as commented code.

Example 11. The method of Example 9, wherein the code action is a custom code action defining one or more custom parameters, the one or more custom parameters used to pass the information representing the feedback to the first IDE.

Example 12. The method of Example 11, wherein the information in the one or more custom parameters is rendered in a graphical user interface element at the first IDE.

Example 13. The method of any of Examples 8-12, further comprising:
  receiving, at the language server, via the LSP, a command from a second IDE to run the first test, on software code in the second IDE, from the first test framework;
  running the first test on the software code by the second IDE, from the first test framework by communicating with the first test framework using the LSP;
  receiving feedback regarding the running of the first test on the software code by the second IDE from the first test framework via the LSP;
  reporting information regarding the feedback on the running of the first test on the software code by the second IDE to the second IDE via the LSP.

Example 14. The method of any of Examples 8-13, wherein the command includes a request to run the first test in a debug mode, and wherein the running the first test from the first test framework by communicating with the first test framework using the LSP includes attaching a debugger to the first test using a debug adapter protocol (DAP).

Example 15. A non-transitory machine-readable medium storing instructions which, when executed by one or more processors, cause the one or more processors to perform operations comprising:
  receiving, at a language server, via a language server protocol (LSP), a command from a first integrated development environment (IDE) to run a first test, on software code in the first IDE, from a first test framework;
  running the first test from the first test framework by communicating with the first test framework using the LSP;
  receiving feedback from the first test framework via the LSP, the feedback including one or more results from execution of the first test on the software code; and
  reporting information regarding the feedback to the first IDE via the LSP.

Example 16. The non-transitory machine-readable medium of Example 15, wherein the command is a command to execute a code action of the language server.

Example 17. The non-transitory machine-readable medium of Example 16, wherein the reporting information regarding the feedback includes writing information representing the feedback into the software code as commented code.

Example 18. The non-transitory machine-readable medium of Example 16, wherein the code action is a custom code action defining one or more custom parameters, the one or more custom parameters used to pass the information representing the feedback to the first IDE.

Example 19. The non-transitory machine-readable medium of Example 18, wherein the information in the one or more custom parameters is rendered in a graphical user interface element at the first IDE.

Example 20. The non-transitory machine-readable medium of any of Examples 15-19, wherein the operations further comprise:
  receiving, at the language server, via the LSP, a command from a second IDE to run the first test, on software code in the second IDE, from the first test framework;
  running the first test on the software code by the second IDE, from the first test framework by communicating with the first test framework using the LSP;
  receiving feedback regarding the running of the first test on the software code by the second IDE from the first test framework via the LSP;
  reporting information regarding the feedback regarding the running of the first test on the software code by the second IDE to the second IDE via the LSP.

Figure 6:
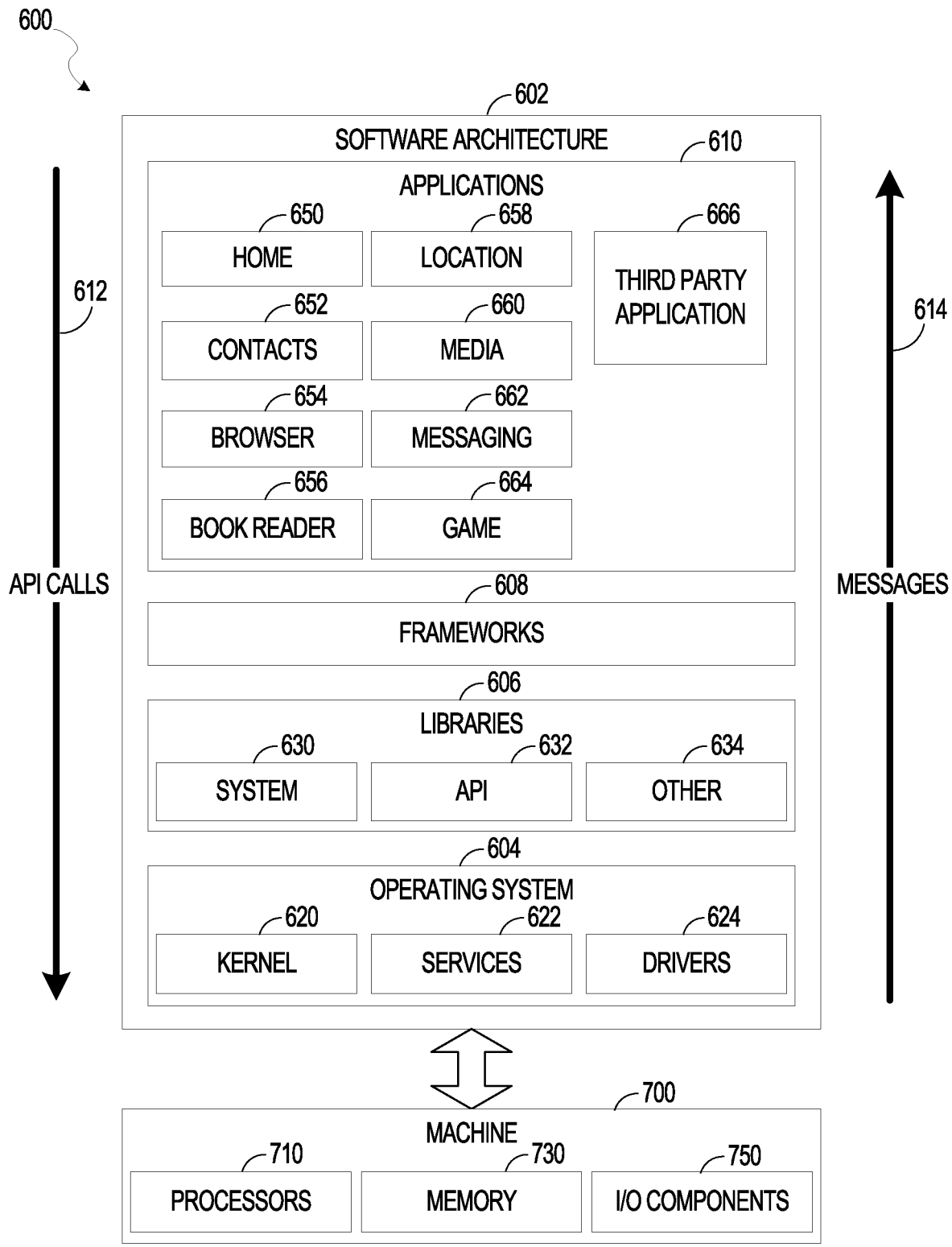
FIG. 6 is a block diagram illustrating an architecture of software, which can be installed on any one or more of the devices described above.

FIG. 6 is a block diagram 600 illustrating a software architecture 602, which can be installed on any one or more of the devices described above. FIG. 6 is merely a nonlimiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionalities. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java™, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
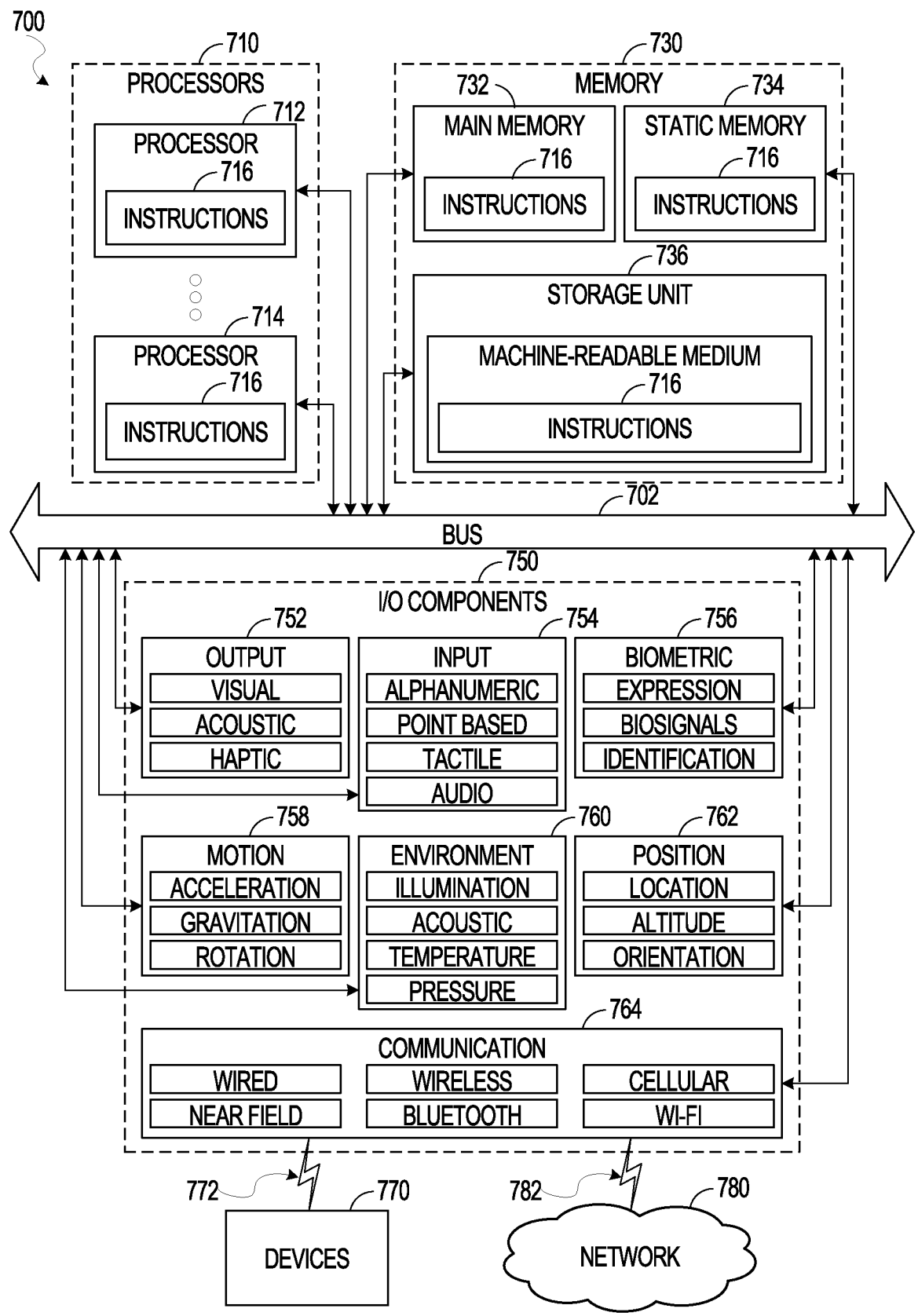
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute the method of FIG. 5. Additionally, or alternatively, the instructions 716 may implement FIGS. 1-5 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors that may comprise two or more independent processors (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor 712), multiple processors 712, 714 with a single core, multiple processors 712, 714 with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., coupled via a USB).

Moreover, the communication components 764 may detect identifiers or include components operable to detect identifiers. For example, the communication components 764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

The various memories (e.g., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., Hypertext Transfer Protocol [HTTP]). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a non-transitory computer-readable medium storing instructions that, when executed by the at least one hardware processor, cause the at least one hardware processor to perform operations comprising:
    receiving, at a language server, via a language server protocol (LSP), a command from a first integrated development environment (IDE) to run a first test of a first test framework, on software code in the first IDE, the language server separate and distinct from the first IDE and shared among multiple IDEs, the first test run in a debug mode;
    running the first test of the first test framework by communicating with the first test framework using the LSP;
    receiving feedback from the first test framework via the LSP, the feedback including one or more results from execution of the first test on the software code; and
    reporting information regarding the feedback to the first IDE via the LSP.

2. The system of claim 1, wherein the command is a command to execute a code action of the language server.

3. The system of claim 2, wherein the reporting information regarding a feedback includes writing information representing the feedback into the software code as commented code.

4. The system of claim 2, wherein the code action is a custom code action defining one or more custom parameters, the one or more custom parameters used to pass the information representing the feedback to the first IDE.

5. The system of claim 4, wherein the information in the one or more custom parameters is rendered in a graphical user interface element at the first IDE.

6. The system of claim 1, wherein the operations further comprise:
    receiving a command from a second IDE to run the first test of the first test framework, on software code in the second IDE, wherein the command is received at the language server, via the LSP;
    running the first test of the first test framework on the software code by the second IDE, wherein the second IDE communicates with the first test framework using the LSP;
    receiving feedback from the first test framework via the LSP, regarding the running of the first test on the software code by the second IDE; and
    reporting information about the feedback regarding the running of the first test on the software code by the second IDE, wherein the information is reported to the second IDE via the LSP.

7. The system of claim 1, wherein the running the first test from the first test framework by communicating with the first test framework using the LSP includes attaching a debugger to the first test using a debug adapter protocol (DAP).

8. A method comprising:
receiving, at a language server, via a language server protocol (LSP), a command from a first integrated development environment (IDE) to run a first test of a first test framework, on software code in the first IDE, the language server separate and distinct from the first IDE and shared among multiple IDEs, the first test run in a debug mode;
running the first test of the first test framework by communicating with the first test framework using the LSP;
receiving feedback from the first test framework via the LSP, the feedback including one or more results from execution of the first test on the software code; and
reporting information regarding the feedback to the first IDE via the LSP.

9. The method of claim 8, wherein the command is a command to execute a code action of the language server.

10. The method of claim 9, wherein the reporting information regarding the feedback includes writing information representing the feedback into the software code as commented code.

11. The method of claim 9, wherein the code action is a custom code action defining one or more custom parameters, the one or more custom parameters used to pass the information representing the feedback to the first IDE.

12. The method of claim 11, wherein the information in the one or more custom parameters is rendered in a graphical user interface element at the first IDE.

13. The method of claim 8, further comprising:
receiving a command from a second IDE to run the first test of the first test framework, on software code in the second IDE, wherein the command is received at the language server, via the LSP;
running the first test of the first test framework on the software code by the second IDE, wherein the second IDE communicates with the first test framework using the LSP;
receiving feedback from the first test framework via the LSP, regarding the running of the first test on the software code by the second IDE; and
reporting information about the feedback regarding the running of the first test on the software code by the second IDE, wherein the information is reported to the second IDE via the LSP.

14. The method of claim 8, wherein the running the first test from the first test framework by communicating with the first test framework using the LSP includes attaching a debugger to the first test using a debug adapter protocol (DAP).

15. A non-transitory machine-readable medium storing instructions which, when executed by one or more processors, cause the one or more processors to perform operations comprising:
receiving, at a language server, via a language server protocol (LSP), a command from a first integrated development environment (IDE) to run a first test of a first test framework, on software code in the first IDE, the language server separate and distinct from the first IDE and shared among multiple IDEs, the first test run in a debug mode;
running the first test of the first test framework by communicating with the first test framework using the LSP;
receiving feedback from the first test framework via the LSP, the feedback including one or more results from execution of the first test on the software code; and
reporting information regarding the feedback to the first IDE via the LSP.

16. The non-transitory machine-readable medium of claim 15, wherein the command is a command to execute a code action of the language server.

17. The non-transitory machine-readable medium of claim 16, wherein the reporting information regarding the feedback includes writing information representing the feedback into the software code as commented code.

18. The non-transitory machine-readable medium of claim 16, wherein the code action is a custom code action defining one or more custom parameters, the one or more custom parameters used to pass the information representing the feedback to the first IDE.

19. The non-transitory machine-readable medium of claim 18, wherein the information in the one or more custom parameters is rendered in a graphical user interface element at the first IDE.

20. The non-transitory machine-readable medium of claim 15, wherein the operations further comprise:
receiving a command from a second IDE to run the first test of the first test framework, on software code in the second IDE, wherein the command is received at the language server, via the LSP;
running the first test of the first test framework on the software code by the second IDE, wherein the second IDE communicates with the first test framework using the LSP;
receiving feedback from the first test framework via the LSP, regarding the running of the first test on the software code by the second IDE; and
reporting information about the feedback regarding the running of the first test on the software code by the second IDE, wherein the information is reported to the second IDE via the LSP.

* * * * *